(12) United States Patent
Durrant et al.

(10) Patent No.: US 7,220,062 B2
(45) Date of Patent: May 22, 2007

(54) ACTIVE BULKHEAD TRANSCEIVER

(75) Inventors: Richard C. E. Durrant, Algonquin, IL (US); Mark Krowiak, Oak Park, IL (US); Mark R. Waldron, Poplar Grove, IL (US)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 11/316,195

(22) Filed: Dec. 22, 2005

(65) Prior Publication Data

US 2006/0193567 A1 Aug. 31, 2006

Related U.S. Application Data

(60) Provisional application No. 60/656,871, filed on Feb. 28, 2005.

(51) Int. Cl.
*G02B 6/36* (2006.01)
*H04B 10/00* (2006.01)

(52) U.S. Cl. .............................. 385/88; 385/92; 385/94; 398/128; 398/135

(58) Field of Classification Search ............ 385/88–94; 398/128, 129, 135–139
See application file for complete search history.

(56) References Cited

U.S. PATENT DOCUMENTS

| | | | |
|---|---|---|---|
| 4,884,861 A | 12/1989 | Nodfelt | 350/96.18 |
| 5,247,595 A | 9/1993 | Foldi | 385/78 |
| 5,528,408 A | 6/1996 | McGinley et al. | 359/152 |
| 5,546,281 A | 8/1996 | Poplawski et al. | 361/752 |
| 6,234,683 B1 | 5/2001 | Waldron et al. | 385/78 |
| 6,305,849 B1 | 10/2001 | Roehrs et al. | 385/59 |
| 6,350,063 B1 | 2/2002 | Gilliland et al. | 385/88 |
| 6,357,929 B1 | 3/2002 | Roehrs et al. | 385/59 |
| 6,371,660 B1 | 4/2002 | Roehrs et al. | 385/59 |
| 6,499,890 B2 | 12/2002 | Gilliland et al. | 385/88 |
| 6,913,402 B2 | 7/2005 | Bohlin et al. | 385/93 |
| 7,104,701 B1* | 9/2006 | Durrant et al. | 385/74 |
| 2005/0163436 A1* | 7/2005 | Bohlin et al. | 385/88 |
| 2006/0006221 A1* | 1/2006 | Durrant et al. | 235/375 |

OTHER PUBLICATIONS

U.S. Appl. No. 60/656,871, filed Feb. 28, 2005, Durrant, et al.
Defense Logistics Agency, Proposed Revisions to MIL-PRF-83526/16, draft pp. 1-10, Sep. 15, 2005, Columbus, Ohio, and printed off of a web site at http://www.dscc.dla.mil/Downloads/MilSpec/Docs/MIL-C-83526/idprf83526ss16.pdf.
Fiber Systems International, Product Drawing "D" Receptacle 4 Channel Hermaphroditic TFOCA II, Aug. 26, 2002, Richardson, Texas, and printed off of a web site at http://www.fibersystems.com/products/drawings/FS4H8000_XY_4CH_D_MT_REC.pdf.

* cited by examiner

*Primary Examiner*—Kevin S. Wood
(74) *Attorney, Agent, or Firm*—Karl D. Kovach

(57) ABSTRACT

The active bulkhead transceiver includes a housing, an insert body, a keying cap, a first ferrule, a second ferrule, a transmitting optical subassembly, a receiving optical subassembly, an electrical connector, a substrate, a cover, and a panel nut. The housing includes seating surface, an aperture, a first thread form, and a second thread form. The panel nut has a thread form, and a seating surface. The thread form of the panel nut is complimentary to one of the thread forms of the housing so that the panel nut is removeably mountable on the housing.

3 Claims, 4 Drawing Sheets

ACTIVE BULKHEAD TRANSCEIVER

This non-provisional application claims the priority of the earlier filed U.S. Provisional Application Ser. No. 60/656,871, filed Feb. 28, 2005. U.S. Provisional Patent Application Ser. No. 60/656,871 is hereby incorporated herein by reference.

BACKGROUND OF THE INVENTION

1. Field of the Invention

The present invention pertains to optoelectronic devices. The invention more particularly concerns an optoelectronic transceiver that is mountable to a bulkhead.

2. Discussion of the Background

An optoelectronic device utilizes at least one optical subassembly. The optical subassembly can be an optoelectronic receiver or an optoelectronic transmitter. An optoelectronic transmitter receives electrical signals, converts the electrical signals to light signals, and then transmits the light signals. An optoelectronic receiver receives light signals, converts the light signals to electrical signals, and then transmits the electrical signals. A transceiver is an optoelectronic device which has at least one optoelectronic receiver and at least one otpoelectronic transmitter.

In order to pass optical signals through a bulkhead, an optical bulkhead connector is employed. The optical bulkhead connector employs, in this example, two channels; however, any number of channels may be used. Two discrete optical fibers define the two channels. A first end of the optical bulkhead connector conforms to one interface and the other ends of the two optical fibers conform to either a different interface or an interface substantially the same as the other interface. The optical bulkhead connector is attached to the bulkhead of the device of interest, such as a tank, so that the first end of the connector is exposed to the ambient environment, and the second end of the connector is exposed to the interior of the vehicle.

Jumper cables are used to connect the bulkhead connector to the transceiver. The jumper cables may run some distance before they connect to the transceiver which is mounted elsewhere within the interior of the vehicle. An example of an optical bulkhead connector is set forth in FIG. 15 of U.S. Pat. No. 6,234,683. Examples of optoelectronic devices are set forth in U.S. Pat. Nos. 5,528,408; 5,546,281; 6,350,063; and 6,499,890. An example of a bulkhead mountable optoelectronic device is set forth in U.S. Pat. No. 6,913,402. U.S. Pat. Nos. 4,884,861; 5,247,595; 5,528,408; 5,546,281; 6,234,683; 6,350,063; 6,499,890; and 6,913,402 are hereby incorporated herein by reference.

Some of the following qualities are paramount during the design phase of a successful military vehicle: the maximization of useable interior space, the reduction of weight, and the increased reliability of components that are used to construct the vehicle. Furthermore, such goals must be met while operating within a limited financial budget.

SUMMARY OF THE INVENTION

It is an object of the invention to provide a transceiver which is mountable to a bulkhead.

It is a further object of the invention to provide a transceiver having a reduced size as compared to known combinations of a transceiver, a bulkhead connector, and the associated lengths of optical fibers and use of optical connectors and adapters so as to combine the separate piece parts.

It is another object of the invention to provide a transceiver having a reduced weight as compared to known combinations of a transceiver, a bulkhead connector, and the associated lengths of optical fibers and use of optical connectors and adapters so as to combine the separate piece parts.

It is still another object of the invention to provide a transceiver having increased reliability as compared to known combinations of an optoelectronic device, a bulkhead connector, and the associated lengths of optical fibers and use of optical connectors and adapters so as to combine the separate piece parts.

It is still yet another object of the invention to provide a transceiver having a unit cost that does not exceed the cost of designing and manufacturing the known combination of a transceiver, a bulkhead connector, and the associated lengths of optical fibers and use of optical connectors and adapters so as to combine the separate piece parts.

It is yet still another object of the invention to provide a transceiver which is easier to install in a vehicle than it is to install in a vehicle the known combination of a transceiver, a bulkhead connector, and the associated lengths of optical fibers and use of optical connectors and adapters so as to combine the separate piece parts.

In one form of the invention the device includes a housing, an insert body, at least two ferrules, a transmitting optical subassembly, a receiving optical subassembly, an electrical connector, a substrate, a cover, and a panel nut. The housing includes a seating surface, an aperture, and two thread forms. The aperture has a first end and a second end. One end of the insert body is configured to be mateable or complimentary with a fiber optic connector that conforms to military standard MIL-PRF-83526/16 (draft dated Sep. 15, 2005). The insert body has is mounted in the aperture of the sleeve. The ferrules are positioned in the insert body. The substrate is attached to the optical subassemblies and to the electrical connector. Mounted on the substrate are electrical signal conditioning components. The electrical signal conditioning components electrically connect the optical subassemblies to the electrical connector. The substrate is mounted in the aperture of the housing. The cover is mountable to the housing so as to substantially cover the second end of the aperture of the housing. The cover also helps to reduce the amount of electromagnetic radiation emanating from second end of the aperture of the housing. However, the electrical connector projects through the housing. The panel nut has a thread form, and a seating surface. The thread form of the panel nut is complimentary to one of the thread forms of the housing so that the panel nut is removeably mountable on the housing. In a mounted position, the thread form of the panel nut engages the one thread form of the housing so that the seating surface of the of the panel nut contacts a first surface of a bulkhead and the seating surface of the housing contacts another surface of the bulkhead so that the transceiver is securely mounted to the bulkhead. The second thread form of the transceiver engages the threads of a fiber optic connector such as one that conforms to MIL-PRF-83526/16, or to the threads on a dust cap.

Thus, the invention achieves the objectives set forth above. The invention provides an optoelectronic device which is mountable to a bulkhead, and is compact. Furthermore, as compared to the known art, the invention is easy to install, light in weight, economical to manufacture, and has increased reliability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
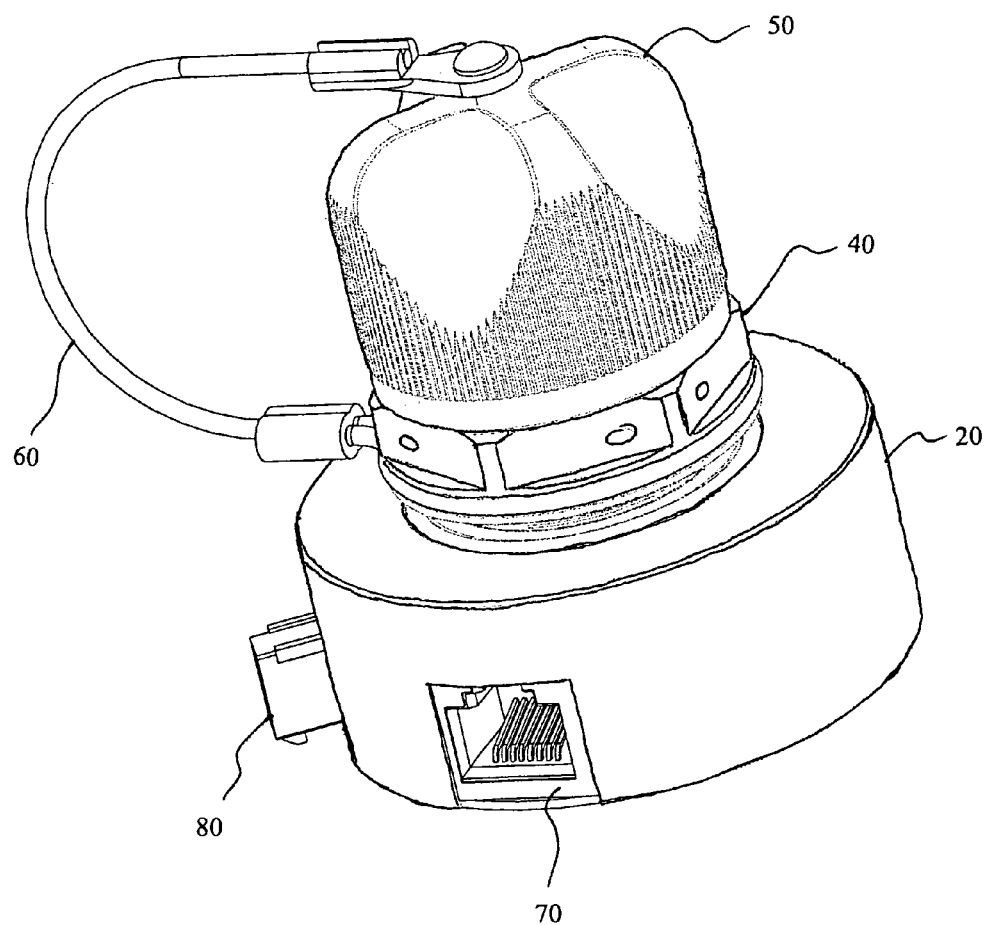
FIG. 1 is a perspective view of the bulkhead mountable transceiver.

Referring now to the drawings, wherein like reference numerals designate identical or corresponding parts throughout the several views, and more particularly to FIGS. 1–6 thereof, an embodiment of the present invention is a device or active bulkhead transceiver 10 which is displayed therein.

FIG. 1 is a perspective view of the transceiver 10. The transceiver 10, as shown in FIG. 1, includes a housing 20, a panel nut 40, a dust cap 50, a lanyard 60, an electrical connector 70, and a power connector 80. The panel nut 40 is mountable on the housing 20 via threaded surfaces. The dust cap 50 is mountable on the housing 20 via a second set of thread forms formed on the housing 20. The lanyard 60 is attached to the dust cap 50 at one end and to the panel nut 40 at the other end. Electrical data signals are passed through the electrical connector 70, and electrical power is passed through the power connector 80.

Figure 2:
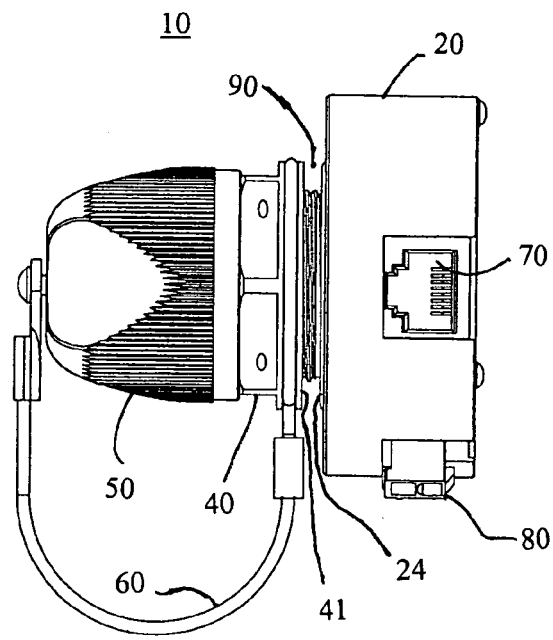
FIG. 2 is a side view of the transceiver of FIG. 1.

FIG. 2 is a side view of the transceiver 10 of FIG. 1. More clearly shown is the area 90 between the panel 40 and the housing 20 which the bulkhead is intended to occupy when the transceiver 10 is mounted to the bulkhead. The area 90 is formed between the seating surface 41 of the panel nut 40 and the seating surface 24 of the housing 20.

Figure 3:
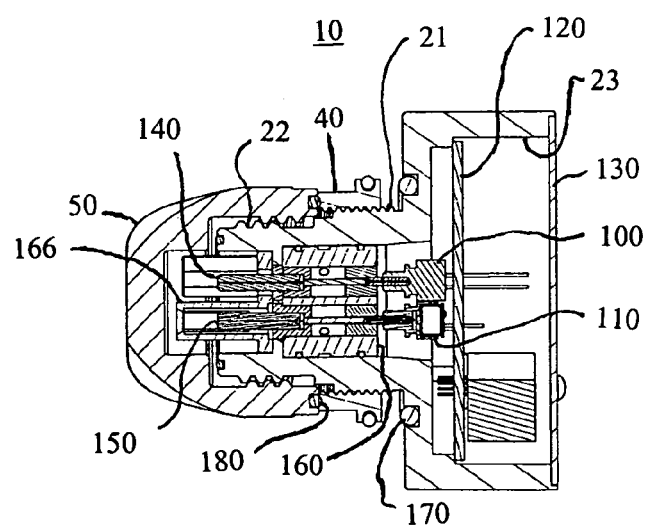
FIG. 3 is a cross-sectional side view of the transceiver of FIG. 2.

FIG. 3 is a cross-sectional side view of the transceiver 10 of FIG. 2. Shown in FIG. 2 are a transmitting optical subassembly 100, and a receiving optical subassembly 110 mounted to a substrate 120. Also mounted on the substrate 120 are electronics which condition the electronic data signals. The substrate is mounted within an aperture 23 of the housing 20. A cover 130 is mounted to the housing 20 so as to seal the aperture 23. The housing 20 includes a first thread form 21 and a second thread form 22. The panel nut 40 has a thread form complementary to the first thread form 21 of the housing 20. The dust cap 50 has a thread form complementary to the second thread form 22 of the housing 20.

An insert body 160 is located in the aperture 23 of the housing 20. Attached to the insert body 160 is a keying cap 166. Also attached to the insert body 160 are ferrules 140 and 150. The ferrules 140, 150 are positioned adjacent to the keying cap 166 and to the thread form 22 of the housing 20 so as to form an interface which is complementary to an interface of a fiber optic connector. Specifically, the interface is complementary to fiber optic connectors that meet the requirements, characteristics, and geometry set forth in MIL-PRF-83526/16 (draft dated Sep. 15, 2005) and which are the same as or functional equivalents of Fiber Systems International, Inc.'s, fiber optic connector which is identified by part number FS4H8000-1-1.

O-ring seal 170 provides a secure seal between the bulkhead and the housing 20. O-ring seal 180 provides a secure seal between the panel nut 40 and the dust cap 50 or the complementary optical connector that conforms to military specification or standard MIL-PRF-83526/16. Other O-ring seals are provided at the interface between the optical connector and the housing 20, and between the insert body 160 and the housing 20. The transmitting optical subassembly 100 is optically connected to ferrule 140 via a small length of optical fiber. The receiving optical subassembly 110 is optically connected to ferrule 150 via a small length of optical fiber.

Figure 4:
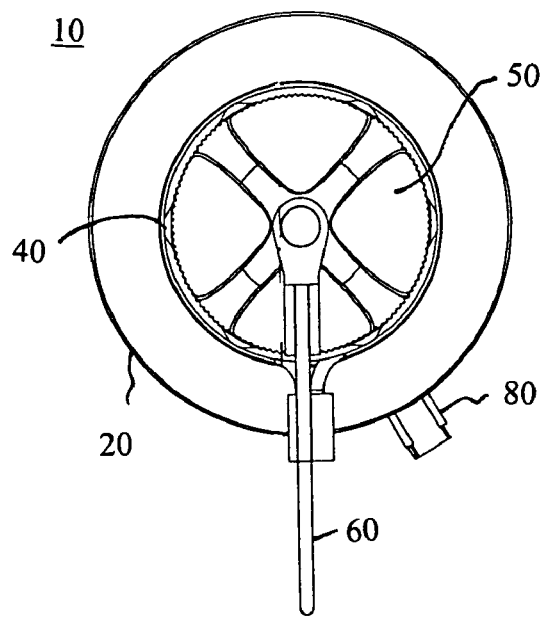
FIG. 4 is a top view of the transceiver of FIG. 1.

FIG. 4 is a top view of the transceiver 10 of FIG. 1. Shown are the housing 20, panel nut 40, power connector 80, dust cap 50, and lanyard 60 of the transceiver 10.

Figure 5:
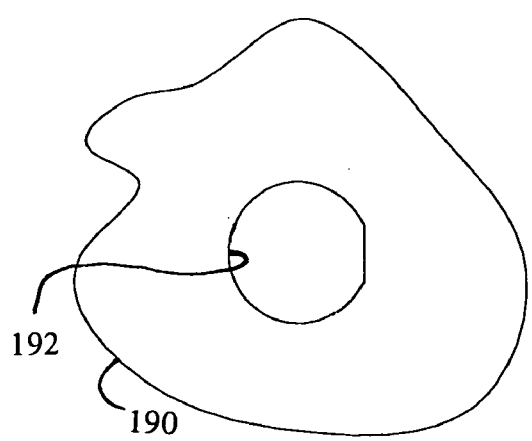
FIG. 5 is a plan view of a section of the bulkhead.

FIG. 5 is plan view of a portion of the bulkhead 190. The bulkhead 190 is shown having an opening 192.

Figure 6:
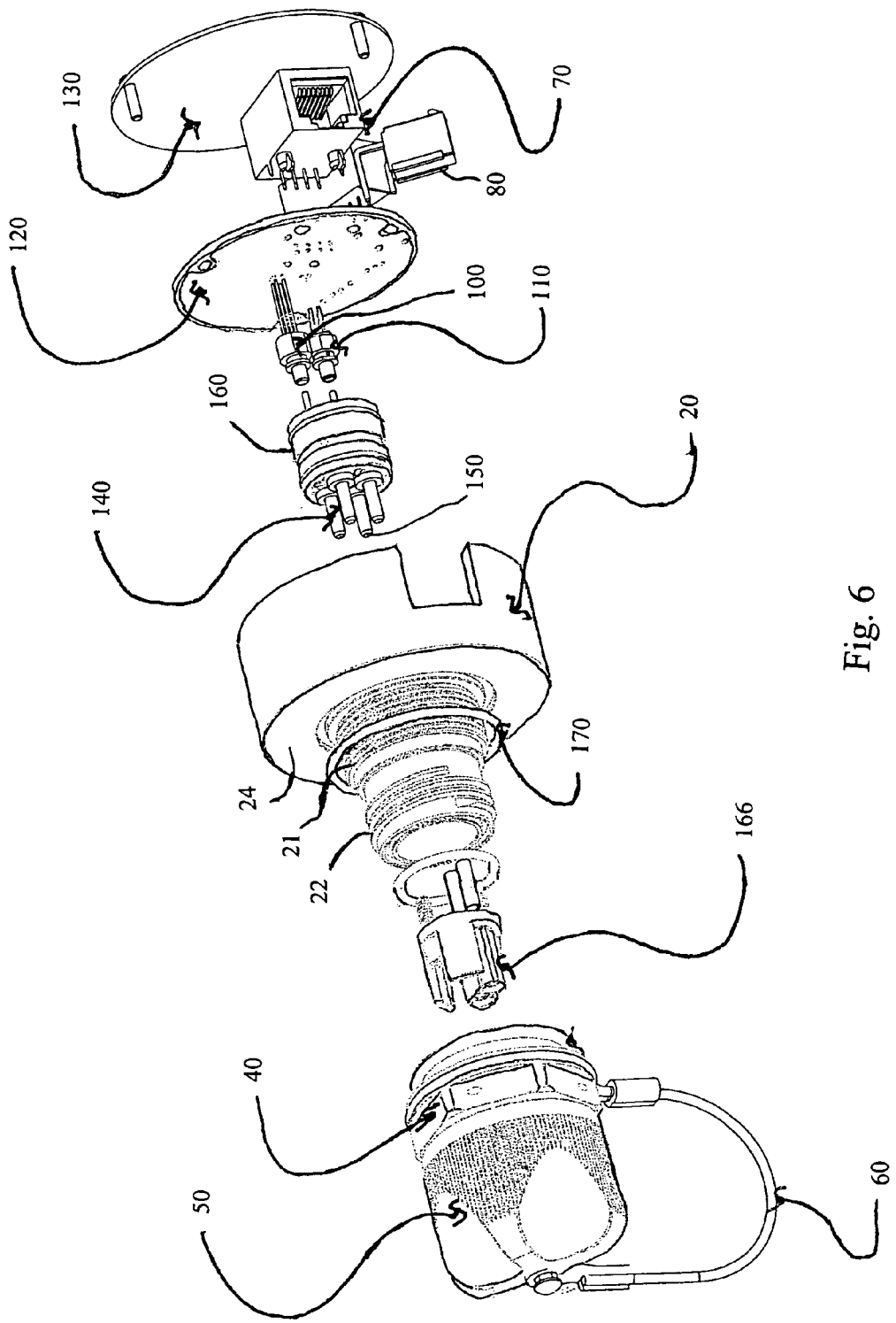
FIG. 6 is an exploded perspective view of the transceiver of FIG. 1.

FIG. 6 is an exploded perspective view of the transceiver 10 of FIG. 1. The insert body 160 and the keying cap 166 are more clearly displayed. The keying cap 166 is conformed to be mateable with optical connectors that conform to military specification or standard MIL-PRF-83526/16. Two other ferrules are shown along with ferrules 140, 150. These other two ferrules are not being used in this configuration. However, it is envisioned that a four channel device can be engineered into the present package, thus using the two unused ferrules.

As compared to known assemblies, the active bulkhead transceiver 10 has eliminated the separate mounting of a transceiver, and the use of fiber optic patch cords to attach an optical bulkhead connector to a remotely mounted transceiver. Thus, the active bulkhead transceiver 10 eliminates optical power losses experienced at numerous junctions since the extra junctions do no exist with the use of the active bulkhead transceiver 10, eliminates weight since the part count is lowered as compared to the known solutions, increases reliability since the part count is lowered as compared to the known solutions, and increases space since the part count is lowered as compared to the known solutions.

Obviously, numerous modifications and variations of the present invention are possible in light of the above teachings. It is therefore to be understood that within the scope of appended claims, the invention may be practiced otherwise than as specifically described herein.

The invention claimed is:

1. A transceiver mountable to a bulkhead, the transceiver comprising:

a housing having a seating surface, an aperture, and a thread form;

a first ferrule;

a second ferrule;

a keying cap positioned in the aperture of the housing, and wherein the first ferrule and the second ferrule are positioned adjacent to the keying cap so as to form an interface which is compatible to accepting a fiber optic connector where the fiber optic connector conforms to a standard designated as MIL-PRF-83526/16;

a transmitting optical subassembly in optical communication with the first ferrule;

a receiving optical subassembly in optical communication with the second ferrule;

an electrical connector, and wherein the electrical connector projects through the housing;

a substrate attached to the transmitting optical subassembly, the receiving optical subassembly, and to the electrical connector, the substrate having electrical signal conditioning components mounted thereon, the electrical signal conditioning components electrically connect the electrical connector to the transmitting optical subassembly and to the receiving optical subassembly; and a panel nut having a thread form, and a seating surface, and wherein the thread form of the panel nut is complementary to the thread form of the housing so that the panel nut is removeably mountable on the housing, and wherein, in a mounted position of the transceiver, the thread form of the panel nut engages the thread form of the housing so that the seating surface of the panel nut contacts a first surface of the bulkhead and the seating surface of the housing contacts a second surface of the bulkhead so that the transceiver is securely mounted to the bulkhead.

2. A transceiver mountable to a bulkhead, the transceiver comprising:

a housing having a seating surface, an aperture, a first thread form, and a second thread form, and wherein the aperture has a first end and a second end;

an insert body mounted in the aperture of the housing;

a first ferrule attached to the insert body;

a second ferrule attached to the insert body;

a keying cap attached to the insert body, and wherein the first ferrule and the second ferrule are positioned adjacent to the keying cap and to second thread form of the housing so as to form an interface which is compatible to accepting a fiber optic connector;

a transmitting optical subassembly in optical communication with the first ferrule;

a receiving optical subassembly in optical communication with the second ferrule;

an electrical connector, and wherein the electrical connector projects through the housing;

a substrate attached to the transmitting optical subassembly, the receiving optical subassembly, and to the electrical connector, the substrate having electrical signal conditioning components mounted thereon, the electrical signal conditioning components electrically connect the electrical connector to the transmitting optical subassembly ad to the receiving optical subassembly;

a cover mountable on the housing so as to substantially cover the second end of the aperture of the housing, and so as to reduce electromagnetic radiation from emanating from the second end of the aperture of the housing; and a panel nut having a thread form, and a seating surface, and wherein the thread form of the panel nut is complementary to the first thread form of the housing so that the panel nut is removeably mountable on the housing, and wherein, in a mounted position of the transceiver, the thread form of the panel nut engages the first thread form of the housing so that the seating surface of the panel nut contacts a first surface of the bulkhead and the seating surface of the housing contacts a second surface of the bulkhead so that the transceiver is securely mounted to the bulkhead.

3. A transceiver mountable to a bulkhead, the transceiver comprising:

a housing having a seating surface, an aperture, a first thread form, and a second thread form, and wherein the aperture has a first end and a second end;

an insert body mounted in the aperture of the housing;

a first ferrule attached to the insert body;

a second ferrule attached to the insert body;

a keying cap attached to the insert body, and wherein the first ferrule and the second ferrule are positioned adjacent to the keying cap and to second thread form of the housing so as to form an interface which is compatible to accepting a fiber optic connector where the fiber optic connector conforms to a standard designated as MIL-PRF-83526/16;

a transmitting optical subassembly in optical communication with the first ferrule;

a receiving optical subassembly in optical communication with the second ferrule;

an electrical connector, and wherein the electrical connector projects through the housing;

a substrate attached to the transmitting optical subassembly, the receiving optical subassembly, and to the electrical connector, the substrate having electrical signal conditioning components mounted thereon, the electrical signal conditioning components electrically connect the electrical connector to the transmitting optical subassembly ad to the receiving optical subassembly;

a cover mountable on the housing so as to substantially cover the second end of the aperture of the housing, and so as to reduce electromagnetic radiation from emanating from the second end of the aperture of the housing; and a panel nut having a thread form, and a seating surface, and wherein the thread form of the panel nut is complementary to the first thread form of the housing so that the panel nut is removeably mountable on the housing, and wherein, in a mounted position of the transceiver, the thread form of the panel nut engages the first thread form of the housing so that the seating surface of the panel nut contacts a first surface of the bulkhead and the seating surface of the housing contacts a second surface of the bulkhead so that the transceiver is securely mounted to the bulkhead.

* * * * *